United States Patent [19]

Finnerty et al.

[11] Patent Number: 4,957,762

[45] Date of Patent: Sep. 18, 1990

[54] PROCESS FOR THE MANUFACTURE OF SHELF-STABLE OAT HOT CEREAL

[75] Inventors: Suja P. Finnerty, Arlington Heights; Marvin K. Lenz, Algonquin, both of Ill.

[73] Assignee: The Quaker Oats Company, Chicago, Ill.

[21] Appl. No.: 356,865

[22] Filed: May 23, 1989

[51] Int. Cl.$^5$ .............................................. A23L 1/168
[52] U.S. Cl. .................................... 426/457; 426/461; 426/462; 426/618; 426/619
[58] Field of Search ............... 426/618, 619, 457, 461, 426/462

[56] References Cited

U.S. PATENT DOCUMENTS

| | | | |
|---|---|---|---|
| 2,185,053 | 12/1939 | Dils | 426/618 |
| 2,554,869 | 5/1951 | Mosher | 426/619 |
| 2,864,702 | 12/1958 | Murray et al. | 426/619 |
| 4,413,018 | 11/1983 | Webster | 426/618 |

*Primary Examiner*—Donald E. Czaja
*Assistant Examiner*—Evan Federman
*Attorney, Agent, or Firm*—Joseph P. O'Halloran; Daniel W. Latham; Mart C. Matthews

[57] ABSTRACT

High-temperature, low-moisture partial gelatinization of oat groats, having a moisture level between 10-20%, sufficient to drop the moisture level to between 3-6%, inclusive, can be used to prepare a flaked oat cereal which is shelf stable, provided the moisture levels of the post gelatinized oats are returned to critical levels of 8-12% inclusive, within 100 minutes after the heat treatment, and provided the flaking step takes place within 48 hours after the end of the remoisturization step.

9 Claims, 2 Drawing Sheets

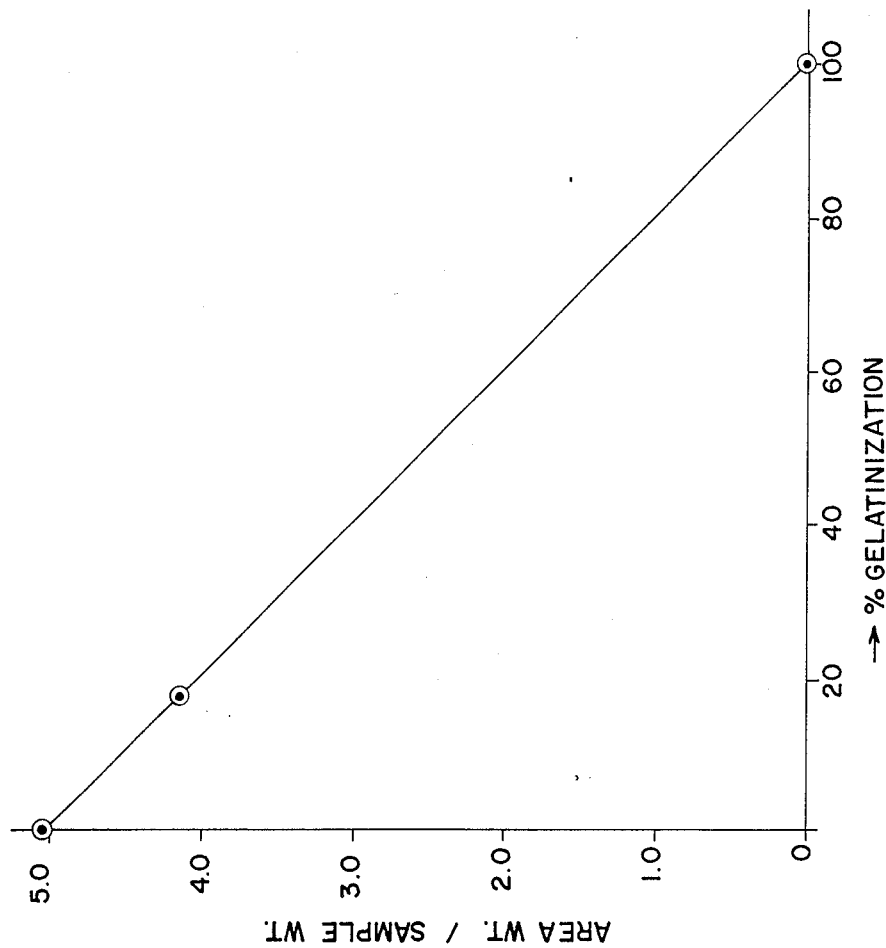

PROCESS FOR THE MANUFACTURE OF SHELF-STABLE OAT HOT CEREAL

TECHNICAL FIELD

This invention relates to the manufacture of shelf stable oat cereals. It involves high-temperature, low-moisture pregelatinization of cut or uncut oat groats. The resulting product may be flaked if desired. Critical steps are disclosed for production of shelf stable product.

BACKGROUND OF THE INVENTION

Natural cereals, such as hot oat cereals, have been achieving higher and higher degrees of acceptance by consumers. With respect to oats, this may be due, in part, to the widespread publication of the beneficial impact of oat bran in providing a healthful lowering of low density lipoprotein cholesterol components in the human system. In view of the increased appreciation of the healthful, beneficial effects of oat products, it is desirable to improve the efficiency and results of traditional oat groat processing, without adversely affecting the natural wholesomeness of the product.

Hence, the oat is a highly nutritious grain, not only in terms of possessing outstanding soluble fiber levels, but also in terms of the richness of its protein, mineral, and lipid content, as well as other nutritive components.

Also, the widespread utilization of these benefits would be enhanced by improvements in the convenience of consumer preparation, and by improvements in the quality of the consumer prepared product.

In addition, the increasingly stringent consumer standards for high quality products, in terms of both organoleptic and convenience attributes, and in terms of healthful nutritional impact, must be met in the products of very economical processes in order for the cereal product to survive in the current, highly competitive marketplace. Moreover, such products, when packaged in conventional packaging materials, must be shelf stable, to the extent of remaining in a desirably consumable form, and in a form which is readily prepared by the consumer, during the time after manufacture, thru the distribution and marketing systems, prior to the consumption by the consumer.

In the case of grain products, generally, and of oat products, in particular, shelf stability is reliant chiefly upon the suppression or avoidance of non-enzymatic, or of enzymatic hydrolytic and/or oxidative reactions which would occur naturally within the grain. To the uninitiated, it may seem straightforward to heat the grain to deactivate the enzymes. However, some kinds of heat processing are believed to aggravate these hydrolytic and/or oxidative reactions, and some kinds of heat processing may suppress one kind of reaction, and aggravate the other. It seems that some heat treatment which would be just right to suppress the enzymatic hydrolysis reactions, would accelerate the oxidative rancidity development of the lipid content. Enzymatic reactions, particularly those involving lipolytic reactions, occur relatively slowly at low moisture and low temperatures, and unless the enzymes are inactivated, or removed, these reactions can cause rancidity, as would be evidenced by the production of high levels of free fatty acids (FFA), or by the production of hydroperoxides.

Many samples of raw, undamaged oat kernels, as harvested, have 3-10% of their fat already in the form of FFA. In addition, usual shelf storage of oats, at 18 degrees C. and at about 13% moisture is reported to involve a slow increase of FFA. The rate of rancidity development is reported to be accelerated by higher moisture levels, and by higher temperatures.

Moreover, in spite of natural antioxidant properties in oats, the development of rancidity of oats attributable to oxidation reportedly can occur even more rapidly under low-moisture and high heat conditions, and oat products subjected to such conditions are reportedly typified by an increase in FFA, as well as by subsequent high peroxide levels. The development of such rancidity is accompanied by an observable deterioration in the organoleptic i.e. sensory, attributes, such as, for example, in the aroma and flavor of the grain.

In addition to aroma and flavor, other attributes such as texture, and convenience of consumer preparation are important in the success of competitive hot cereal products. There are a variety of flake thicknesses which must be made available, in order to meet consumer preferences, and demands, such as for example Steam Table, Old Fashioned, Quick, and Instant types. These types are a function of flake thickness, and affect the convenience of consumer preparation. Improvements in oat processing should be amenable to the production to all types of oat flake products.

With the meteoric increase in the use and availability of microwave ovens, this method of consumer preparation of hot oat cereals has also become increasingly popular. Parents are believed to be increasingly likely to encourage their pre-teen and adolescent family members to prepare a personal serving bowl of hot oat cereal in the microwave. However, one of the characteristics of certain of the types of heretofore available flaked oat cereals, is the tendency to foam out of the bowl in ordinary microwave preparation, unless considerable care and precision in measuring, timing, etc. is exercised. And, of course, many youthful consumers, and others, are not particularly noted for taking such pains in their routine activities.

Hence, it would be desirable to provide improvements in oat processing which result in an oat cereal product which is not particularly sensitive to reproduction of exact conditions such as timing and the quantity of water, for successful consumer preparation in the microwave.

The problems associated with stability of oats are discussed in several articles and patents. For example, see the following:

H. F. Martin, FACTORS IN THE DEVELOPMENT OF OXIDATIVE RANCIDITY IN READY TO EAT CRISP OAT FLAKES, published in the JOURNAL OF SCIENCE OF FOOD AND AGRICULTURE, 1958, No. 12, pages 817-854.

Dr. Francis Webster, U.S. Pat. No. 4,413,018, Method for Manufacture of Whole Grain Oat Product.

As surprising as it may seem, the heat treatment to which the groats have been subjected for the purpose of inactivating the enzymes does not gelatinize the starch in the oat groats. Even the process of steaming prior to the flaking steps has been found to result in substantially no gelatinization of the starch in grain. This has been determined using traditional methods, i.e. microscopic examination of the starch cells for loss of birefringence, as well by more recently developed methods, e.g. by the use of Differential Scanning Calorimetry (DSC).

Prior-art heat treatments, for the purpose of providing an "instant" type cereal, did not necessarily involve gelatinization of the oat starches to a significant extent. For example, U.S. Pat. No. 2,864,702 involved "toasting" of unhulled oats, and temperatures of up to about 210 Degrees F. and resulted in a product which was ungelatinized (See Claims 3 and 4, for example.) Yet, upon being placed in boiling water such products reportedly hydrated quickly.

We have discovered, however, that microwave foamover is a substantial problem during the cooking of raw oat products, using the amount of oats per serving, and the amount of water generally believed to be appropriate.

It is an object of the present invention to provide a high speed, competitive process for the partial pre-gelatinization of oat groats for use in the manufacture of flaked or rolled hot oat cereals.

It is also an object of the present invention to provide a method for such pre-gelatinization which results in a shelf stable product having improved flavor and texture qualities when consumer-prepared.

It is also an object of the present invention to provide a hot oat cereal which is particularly well suited to preparation in a microwave oven.

SUMMARY OF THE INVENTION

These and other objects, which will be apparent hereinafter, are all achieved in accordance with the present invention, in which oat groats are subjected to a short-time, high-temperature, low-moisture, dry air heat treatment step. By high temperature, we mean temperatures in the range of 400–600 Degrees F., inclusive. By low moisture, we mean that the starting groat moisture levels are in the range of about 20% or less, preferably 14% or less, in the grain. The short-time process is limited to that time which will provide a moisture level in the resulting treated grain in the range of 3–6% inclusive, preferably in the range of 4–6%, after the heat treatment step. In accordance with the present invention, the thus-treated groats are then quickly re-moisturized to specified levels, i.e. to between 8–12%, by the addition of water, within the critical period of time, i.e. within 100 minutes, preferably within 30 minutes after the heat treatment, in order for the process to result in shelf stable products. If employed, a subsequent flaking step must also be applied within critical periods of time, e.g within 48 hours, and preferably within 24 hours after the remoisturization step, in order for a stable flaked product to result.

In accordance with preferred aspects of the present invention, a bed of oat groats, such as steel-cut groats, is heated by hot air to a high temperature, for example in a Jet-zone (TM) Oven. Exemplary temperature-time conditions using this equipment, are 500 degrees F. for sixty seconds.

Generally speaking, time-temperature conditions sufficient to dry the groats to a moisture level of between 3–6%, inclusive, in a time between 30 and 120 seconds, and in hot air at a temperature between 400–600 degrees F., are useful in the high-temperature, low-moisture, short-time process step in accordance with this invention. We have discovered that if the grain is over-dried, i.e. to below 3%, it will not accept the moisture in the remoisturization step, and it will go rancid. If you don't dry it low enough, i.e. to below about 6%, you don't get the beneficial effects. The resulting "toasted" grain is cooled, and sufficient water is added with mixing, to raise the moisture content to about 8–12% moisture, inclusive. This hydration must be done within 100 minutes, and preferably within 30 minutes of the time that the heating is discontinued.

If desired, the resulting grain can then be rolled, or flaked, using conventional processing and equipment. For example, the resulting remoisturized grain may then be steamed at 200–220 degrees F. for 8–10 minutes, (preferred), and then rolled into an appropriate thickness. The specific thickness imparted depends on whether an Instant or Old Fashioned, or some other type flake, is desired, for example. If the remoisturization step is omitted, the preflaking steaming step will not prevent the product from becoming rancid.

We have discovered that, when the product of the process of the present invention is used, the flake thicknesses which are required to produce a type of microwave consumer-prepared product corresponding to some traditional brackets or types of rolled oats, must be thicker. In fact, in order for a flaked product in accordance with this invention to correspond to a consumer-prepared type of oat flakes, the product of this invention must have a thickness which corresponds to the next thicker respective bracket if one were using traditional guidelines. For example, to produce a flaked oat product which corresponds, after consumer preparation, to instant flakes, a thickness of 0.015–0.019 inches is required using flakes prepared in accordance with this invention, as compared to the traditional instant flake thicknesses in the range 0.011–0.014inches, using the raw flakes prepared by conventional processes. For "Quick" type oat flakes, 0.020–0.024 inches is preferred, using flakes prepared in accordance with this invention, as compared traditionally prepared "Quick" rolled oats which have a thickness of 0.015–0.019 inches. Likewise, to produce a product which a consumer would regard as equivalent to Old Fashioned, in accordance with this invention, the product is flaked to a thickness of 0.025–0.029 inches, instead of the conventional, 0.020–0.024 inch thickness range. "Steam Table Oats" are flaked to thicknesses between 0.030–0.033, using product made in accordance with this invention, whereas thicknesses of between 0.025–0.029 were used in conventional methods of preparation.

The rolling or flaking step must be applied within a 48 hour, preferably within a 24 hour period of time after the remoisturization step in accordance with this invention, or a shelf stable flaked product will not result.

DESCRIPTION OF PREFERRED EMBODIMENTS

Oat groats which are used as the starting material in the process of the present invention may be pre-treated under well known, conventional heat-steam conditions for the purpose of deactivating enzymes, etc. However, we see no difference in result, either with respect to storage stability or with respect to product characteristics, whether the starting groats have been subjected to such treatment or not in connection with the process of the present invention. The "normal" groats, which are the starting material for the process of the present invention, have a moisture level above about 6%, preferably in the range of 8–20%, more preferably in the range 8–14%, inclusive.

In essence, the heat treatment in accordance with the present invention involves heating a bed of groats, whole or cut, in very hot, dry air, (at temperatures between 400–600 degrees F. inclusive) for a very short period of time (e.g. preferably between 30–120 seconds), most preferably between 30–90 seconds under temperature-time conditions adequate to dry the groats to a moisture level between 3–6%, inclusive. By use of the term "dry" air, it is meant that there is no substantial level of steam added to the heated air. Ambient room air, heated to the above temperatures, is an example of what is considered to be high-temperature "dry" air for use in accordance with this invention, even though there may be high "relative humidity" in the ambient air.

While the preferred air for use in the heat treatment step in accordance with the present invention is ordinary ambient room air, heated to the stated temperatures, the presence of substantial levels of moisture in the high-temperature air will not adversely affect the process. However, the use of substantial levels of steam, or live steam, as the sole heating medium is not in accordance with the process of the present invention for the heat treatment step.

We have found that the measurement of the groat moisture level is a better parameter for judging the appropriateness of the temperature-time conditions, than the measurement of the groat temperature upon discharge from the heat-treatment bed.

It should be noted that the use of the process of the present invention is not limited to "normal" groats having moisture in the stated range above. However, if groats having substantially higher moisture levels are used, e.g. if groats having moisture levels of about 18%, are used as the starting material in accordance with this invention, slightly longer times in the hot dry air treatment bed are required, e.g. about 15 seconds more treatment.

It is preferred, but not critical, that the mass of groats discharged from the heat-treatment bed be cooled quickly to ambient temperatures. For example, using a circulating air cooler (a screen supporting a thin bed of groats positioned to allow room temperature air to circulate thru the bed) it may take about 10 minutes to "cool" the groats to ambient temperature.

When the remoisturization takes place within 100 minutes, preferably within 30 minutes of the completion of the heat treatment step, we observe no substantial difference in the stability of the fat in the products, as measured by DSC Curves taken on the extracted fat.

However, references to product stability, and to product becoming rancid, as used herein, are made on the basis of results of taste panel testing of the product, not on the basis of DSC Curves of extracted fat, for example. We found very poor correlation between the predictions made from DSC Curves, and the results obtained after storage, as made by taste panels.

It is also critical that a flaking or rolling step, if employed, take place within 48 hours, preferably within 24 hours of the completion of the remoisturization step. The tempered groats, being between 8–12% moisture, need to be further tempered in order to withstand the physical stress and strain of the rolling step. Hence, an entirely conventional rolling or flaking step may be employed as one of the steps of this process. Thus, the remoisturized groats may then be softened by steaming, which, incidentally raises the moisture an additional 5–8%, and rolled in a conventional manner. Since the rolling processes are well known, and widely understood, the details will not be delved into here.

The resulting rolled oats, sometimes called flaked oats in Britain, are then dried in a conventional manner, to a moisture level of between about 9% and 12%. The oat grain product is now ready for conventional packaging.

THE DRAWINGS

The drawings consist of a plurality of curves prepared by Differential Scanning Calorimetry, DSC. These curves relate to tests which were made for the purpose of determining the degree of gelatinization. (They do not relate to the tests referred to herein using DSC for the purpose of measuring the stability of the fat in the product.)

By way of summary, FIG. 1 represents a DSC curve of grain product which is not prepared in accordance with this invention, and is provided for comparison purposes and for the purpose of illustrating the setting up of analytical procedures. FIG. 2 represents a DSC curve of product which is prepared in accordance with this invention.

It is noted that a 100% cooked product would produce a DSC curve in which the normalized area under the curve is zero. The "normalized area" term refers to the area under the curve, corrected to the area which would have been obtained had a specific weight of product been used in the test. The plot of the normalized area data provides a "normalized curve" showing the area under the curve (expressed in square centimeters per milligram of dry sample), against the % gelatinization, for samples of products of the present invention. The latter is presented as FIG. 3. herein.

Hence,

FIG. 3 is a a plot of the Normalized Area Under The DSC Curves vs. % Gelatinization.

When raw or cooked cereals are subjected to the DSC test, for the purpose of determining the degree of gelatinization, the tested sample is heated under conditions which provide a constant rate of increase of temperature, for example, 5 Degrees /minute. Initially, all the input heat goes to raise the temperature of the sample, and the input heat transfer rate is substantially constant. However, the sample which is not completely gelatinized begins to absorb substantial additional heat when the gelatinization temperature is reached, and this heat is not available, so to speak, to raise the temperature of the sample. This causes the test apparatus to provide an increase in the heat input (in order to maintain the temperature increase rate constant) and the increase in heat input is what is visualized on the DSC chart as a dip under the curve being tracked. The area of the "dip" under the DSC curve is inversely proportional to the extent of gelatinization. That is, "raw" oat cereals absorb a relatively large amount of heat, while it is being cooked in the test instrument, and hence the DSC curve shows a relatively large dip below the line which would have prevailed had the sample been completely cooked. On the other hand, if a completely gelatinized sample is being tested, no "dip" is observed.

Figure 1:
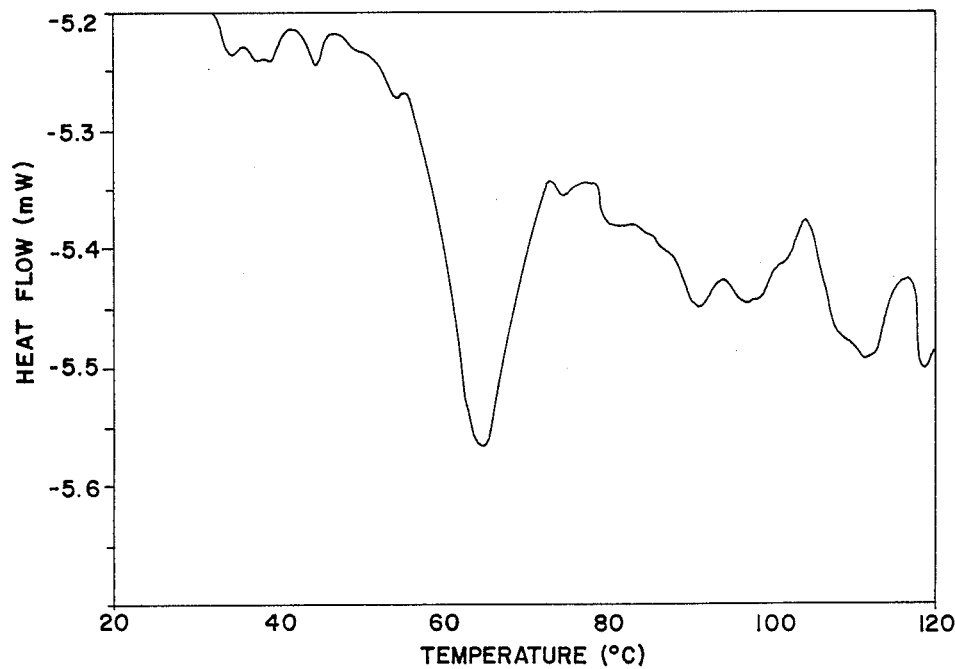
FIG. 1 is a Differential Scanning Calorimetry (DSC) curve obtained using raw steam table oats as a sample.

The Differential Scanning Calorimetry method is one method by which one with ordinary skill in the art may determine the extent to which the oat grain, processed in accordance with this invention, is gelatinized. Referring to the drawings, FIG. 1 represents the DSC curve obtained using a sample of raw, uncooked Steam Table Oats. It is noted that there is a major "dip" in the curve beginning in mid-fifty degrees area, peaking at about 63 degrees and continuing to about 70 degrees.

The area of this dip, sometimes referred to as the area under the DSC curve, being proportional to the amount of heat necessary to gelatinize the sample, is also proportional to the amount of sample used. (The area under the DSC curve using a fully cooked sample is zero, because no heat is needed to cook the already fully cooked sample.)

Therefore, instead of using the actual area under the DSC curve, it is more meaningful to measure this area under the curve, and to calculate, or compute the area which would have been obtained from some standard weight of sample, i.e. to the area which would be obtained from the use of some "normal" weight of sample. This is done by dividing the specific, observed area by the specific weight of the sample. This provides the "normalized" data. The resulting "normalized" data is then entered on a separate graph to obtain the plot of the "Normalized Area Under The Curve vs. Gelatinization." such as that shown in FIG. 3.

Hence, by plotting the normalized area under the curve for a raw sample, (0% Gelatinization) to obtain a point at one end of a line, and by using as a second end point located at the zero area under the DSC curve at 100% gelatinization, and by drawing a line between these two points, one obtains a line similar to that of FIG. 3, herein. Using such a FIGURE, it becomes a simple matter to accurately estimate the percent gelatinization of a cooked, or partially cooked oat sample, for example, using the DSC method by simply determining the normalized area under the DSC curve for a particular sample, and locating the % gelatinization from the Figure similar to FIG. 3 which corresponds to that normalized area under the DSC curve.

THE EXAMPLES

The method of this invention is further illustrated by the following Examples, in which all parts are in parts by weight, all percentages are in percent by weight based on the weight of the material or mixture then being referred to, and all temperatures are expressed in degrees Fahrenheit, unless otherwise referred to. Whenever ranges are given, it is intended that the ranges be inclusive, unless otherwise noted. Also, as used herein, the word "cereal" may refer to a grain itself, or to the admixture of the processed grain or grain component in water or milk. The latter, in some other English-speaking countries may also be referred to as "porridge." Which meaning of the word "cereal" is intended will be clear, in each instance, from the context.

EXAMPLE 1

Figure 2:
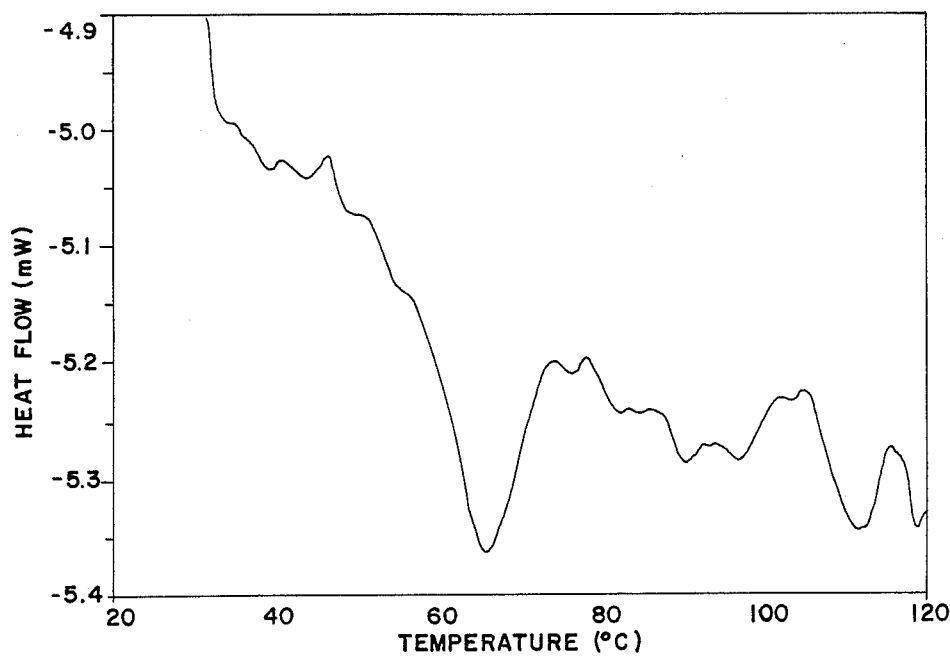
FIG. 2 is a DSC curve obtained using the product of Example 1 herein, as a sample.

Whole A-grade groats having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed. The airflow is provided from ambient room air heated to the stated temperature. The resulting toasted grain is discharged from the fluidized bed, onto a circulating air conveyor screen. The grain was cooled by ambient temperature air. After cooling, the resulting grain was found to have a moisture content of 5%, and was found by Differential Scanning Calorimeter studies to be about 19% cooked. (See FIGS. 2, and 3.) The cooled grain is transferred to a mixer, and sufficient water was added immediately with mixing, to raise the moisture to 8–12 percent moisture. This hydration was done within 15 minutes of the time that the heating was discontinued.

Within about 20 hours of the time of the addition of water, the grain is softened by contact with live steam at 200–220 degrees for about 9 minutes, and the grain is then subjected to the action of conventional grain rollers, and is rolled to a thickness of about 0.030 inches. The resulting flakes are re-dried to a moisture level of about 9–12%, packaged, and stored.

This product is equivalent in after-consumer-cook characteristics to what is called "Steam-Table Oats" in the trade. (However, it is considerably thicker than the flakes which would produce the "steam table" type characteristics if conventional flakes were to be used. The "steam table" type oat flakes would be used primarily by restaurants and other institutions which need to keep the oats "consumer ready" for long periods of time. However, many people like oatmeals with pronounced flaky characteristics, and this type product is also eminently satisfactory for use in microwave for individual serving, for single serving service preparation for immediate consumption, as well.

A portion of the resulting cereal product is cooked in a microwave oven, using the following method: ⅔ cup of water is admixed with an ounce of the pregelatinized oat product of this example, in a standard 16 ounce bowl, and the mixture is placed in a microwave oven. The oven is operated on high power, set for a 3.0 minute cycle. No foam-over occurs during the microwave cooking. The resulting product is found to be ready for consumption. However, the amount of water used above in this example, though heretofore regarded to be at the "usual" ratio, was perceived to be more than what was apparently necessary, in view of the free water remaining in the mixture after the cook. In fact, rather than resulting in an aqueous phase with a creamy consistency, the aqueous phase of the resulting microwave cooked cereal was somewhat watery.

Hence, the consumer-preparation microwave cooking cycle was repeated, this time with only ½ cup of water, instead, and the resultinq product was judged as having excellent textural qualities. No foam-over was encountered in the microwave during the last mentioned cooking process. Texture and flavor of this product is substantially identical to that of Steam Table Oats. (However, normally, oat flakes at Steam Table Oat's thickness would take from 10 to 15 minutes to cook, and would be extremely likely to boil over in the microwave.)

EXAMPLE 2

This example is similar to Example 1, except that the groats used in this test were steel-cut.

Oat groats are steel-cut in the well known, conventional manner. These groats, having a moisture level of about 14% were charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed. The resulting toasted grain was discharged from the fluidized bed, onto a circulating air conveyor screen. At this point, the resulting grain was found to have a moisture content of 5%, and was found by Differential Scanning Calorimeter studies to be about 20% cooked. The grain was cooled by ambient temperature air. The cooled grain was transferred to a mixer, and sufficient water was added immediately with mixing, to raise the moisture to 8-12 percent moisture. This hydration was done within 15 minutes of the time that the heating was discontinued.

Within about 5 hours of the time of the addition of water, the grain is steamed by being subjected to live steam at 200-220 degrees for about 9 minutes, and the grain is then subjected to the action of conventional grain rollers, and is rolled to a thickness of about 0.030 inches.

A portion of the resulting cereal product is cooked in a microwave oven, using the following method: ⅔ cup of water is admixed with an ounce of the pregelatinized oat product, in a standard 16 ounce bowl, and the mixture is placed in a microwave oven. The oven is operated on high power, set for a 3 minute cycle. No foam-over is observed during this heating cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product is substantially identical to that of Steel-Cut Steam Table Oatmeal which was prepared on the stove top in accordance with package directions.

EXAMPLE 3

Oat groats are steel-cut in the well known, conventional manner. These groats, having a moisture level of about 14% were charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed.

The resulting toasted grain was discharged from the fluidized bed, onto a circulating air conveyor screen. At this point, the resulting grain was found to have a moisture content of 5%, and was found by Differential Scanning Calorimeter studies to be about 20% cooked. The grain was cooled by ambient temperature air. The cooled grain was transferred to a mixer, and sufficient water was added immediately, with mixing, to raise the moisture to 8-12 percent moisture. This hydration was done within 15 minutes of the time that the heating was discontinued.

Within about 5 hours of the time of the addition of water, the grain is steamed by being subjected to live steam at 200-220 degrees for about 9 minutes, and the grain is then subjected to the action of conventional grain rollers, and is rolled to a thickness of about 0.018 inches. The flakes are dried to a moisture of 9-12%, packaged and stored. The product of this example is equivalent, in thickness, to that of conventional "Quick" oats, but in performance, it is rated by taste panels and expert preparers to be equivalent to "Instant" oats.

A portion of the cereal product of this Example is cooked in a microwave oven, using the following method: ⅔ cup of water is admixed with an ounce of the pregelatinized oat product of this example, in a standard 16 ounce bowl, and the mixture is placed in a microwave oven. The oven is operated on high power, set for a 2.0 minute cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product was substantially identical to that of Quick Oats which was prepared on the stove top. Moreover, when tested in a taste panel, the product of this example was rated preferred over instant oats which were prepared in accordance with package directions. (Normally, Quick Oats would take from 2 to 2.5 minutes to cook when prepared on the stove top.)

Another portion of the product made in accordance with this example is consumer-prepared in a one step "INSTANT" method, using the following procedure: One ounce of the cereal product of this example is admixed with ½ cup of boiling water, left to sit for 1 minute, or more if desired, as in the standard instant oatmeal directions. The texture and flavor of the resulting product is better, being more flaky, and less pasty, than a widely available, presently conventional instant oatmeal, prepared in accordance with package directions.

EXAMPLE 4

Oat groats are steel-cut in the well known, conventional manner. These groats, having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed.

The resulting toasted grain is discharged from the fluidized bed, onto a circulating air conveyor screen. At this point, the resulting grain was found to have a moisture content of 5%, and was found by Differential Scanning Calorimeter studies to be about 20% cooked. The grain was cooled by ambient temperature air. The cooled grain is transferred to a mixer, and sufficient water was added immediately with mixing, to raise the moisture to 8-12 percent moisture. This hydration was done within 15 minutes of the time that the heating was discontinued.

Within about 5 hours of the time of the addition of water, the grain is steamed by being subjected to live steam at 200-220 degrees for about 9 minutes, and the grain is then subjected to the action of conventional grain rollers, and is rolled to a thickness of about 0.024 inches.

A portion of the resulting cereal product is cooked in a microwave oven, using the following method: ⅔ cup of water is admixed with an ounce of the pregelatinized oat product, in a standard 16 ounce bowl, and the mixture is placed in a microwave oven. The oven is operated on high power, set for a 2 minute cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product is substantially identical to that of Old Fashioned oatmeal, sometimes called "Regular" oatmeal, which would have taken from 5–6 minutes of cooking, using normal package directions.

EXAMPLE 5

This example is for the purpose of comparison, only, and does not represent a method of preparation which is in accordance with the present invention. Rather, it represents what is believed to be a common, conventional method of making rolled oats.

A-grade groats having a moisture level of about 14% are steamed in conventional manner to deactivate enzymes.

The grain is flaked using a conventional flaking process in which it is softened by being subjected to live steam at 200–220 degrees for about 9 minutes, raising the moisture level to about 18% and the grain is then subjected to the action of conventional grain rollers, where it is rolled to a thickness of about 0.024 inches.

Upon drying in high-temperature air to a moisture level of about 11%, the resulting grain is packaged and stored.

This product is found by Differential Scanning Calorimeter to completely uncooked. (See FIG. 1.) When subsequently cooked in a microwave oven, in a standard 16 ounce bowl, and following package directions, using three quarters of a cup water per ounce of grain flakes, the mixture foamed over before the 5–6 minute cook cycle was completed. In addition, the product, when cooked had a very gummy and pasty texture, substantially identical to that of conventional instant oats prepared by using the boiling water method.

DISCUSSION

With respect to the high-temperature, short-time, dry air cooking conditions, which are used in accordance with this invention, it should be noted that the time-temperature conditions used in Examples 1–4, above, are illustrative of preferred embodiments only, and that other conditions within the scope and concept of the claims of this invention may be used to provide the degree of heat treatment necessary for the practice of this invention. For example, temperatures of about 450 Fahrenheit for 70 seconds, or 550 degrees F. for 50 seconds, are also eminently satisfactory for use in accordance with preferred aspects of this invention, and give equally acceptable results as those shown in the Examples. A series of tests was done with uniform starting material, except that it had moisture levels in the range from about 10–14%, inclusive. If the starting material has lower or higher initial moisture, slightly shorter or longer times, and/or lower or higher temperatures are preferred and such adjustments in cooking conditions are readily determined by simple experimentation.

We have found that the use of grains having initial moisture levels in the range of 8%–20% are eminently satisfactory, for example, and our tests indicate that grains having initial moistures even higher give satisfactory results.

After the high-temperature dry cooking step in accordance with this invention, by observation of the Maltese Crosses, and by observation of the areas under the DSC (Differential Scanning Calorimetry) curves, it is estimated that between 10–45% gelatinization has been accomplished when preferred conditions are employed in the heat treatment step in accordance with this invention.

In order to evaluate the effect of higher levels of gelatinization, we also made longer time treatment Jetzone runs to achieve up to about 50% gelatinization. Above this level of gelatinization using the high-temperature, short-time process of this invention, we got some burning of the product in the Jetzone cooker, and hence, we regarded the product as unsuitable from the viewpoint of flavor.

What is claimed is:

1. A process for manufacture of hot oat cereals, comprising the steps of: subjecting oat groats to high temperature hot air treatment for a period of time from about 30 to 120 seconds, inclusive, said period of time at the employed temperature being sufficient to partially gelatinize the starch in said groats, and to drop the moisture level of the groats to between about 3% and 6% inclusive; and adding water to the resulting groats within 100 minutes or less from the time the hot air treatment is discontinued to bring the moisture content to a level between 8% to 12%, inclusive.

2. The process of claim 1 in which the initial high-temperature air treatment step uses air at a temperature between 400–600 degrees F.

3. The process of claim 2 in which the initial high-temperature air heating step utilizes the hot dry air at a temperature of between 450–500 degrees F., inclusive.

4. The process of claim 1 in which between 10% and 45%, inclusive, of the starch in said groats in gelatinized.

5. A process for manufacture of hot oat cereals, comprising the steps: subjecting oat groats having a moisture level between 8–20%, inclusive, to high-temperature hot air treatment for a period of time from about 30–90 second, under temperature-time conditions sufficient to drop the moisture level of the groats to between about 3%, and 6%, inclusive: and within 30 minutes, adding water to the resulting groats to bring the moisture level to between 8–12% inclusive.

6. A process for manufacture of hot oat cereals, comprising the steps: subjecting oat groats having a moisture level between 8–20%, inclusive, to high-temperature hot air treatment for a period of time from about 30–90 seconds, under temperature-time conditions sufficient to drop the moisture level of the groats to between about 3%, and 6%, inclusive; adding water to the resulting groats to bring the moisture level to between 8–12% inclusive; steaming the resulting groats to a moisture level of about 14–20% and flaking the resulting steamed groats; redrying the resulting flaked groats to a moisture level of about 9–14%, and packaging the resulting product; said adding water step taking place within 100 minutes after completion of the heating step, and said steaming and flaking taking place within 48 hours after the end of said adding water step.

7. The process of claim 6 in which the initial high-temperature air treatment step uses air at a temperature between 400–600 degrees F.

8. The process of claim 6 in which the initial high-temperature heating step utilizes the hot dry air at a temperature of between 450–500 degrees F., inclusive.

9. The process of claim 6 in which the adding of water takes place within 30 minutes or less from the time the heat treatment is discontinued.

* * * * *